United States Patent [19]

Schnable et al.

[11] Patent Number: 5,155,554
[45] Date of Patent: Oct. 13, 1992

[54] LARGE APERTURE REFLECTIVE INTERFEROMETER FOR MEASURING CONVEX SPHERICAL SURFACES

[75] Inventors: George K. Schnable, Fairport; Steven J. VanKerkhove, Rochester, both of N.Y.

[73] Assignee: General Signal Corporation, Stamford, Conn.

[21] Appl. No.: 632,108

[22] Filed: Dec. 20, 1990

[51] Int. Cl.$^5$ .............................................. G01B 9/02
[52] U.S. Cl. ...................................... 356/359; 356/360
[58] Field of Search ................... 356/359, 360; 350/442

[56] References Cited

U.S. PATENT DOCUMENTS

| | | | |
|---|---|---|---|
| 2,661,658 | 12/1958 | Dyson | 350/442 |
| 4,869,593 | 9/1989 | Biegen | 356/359 |
| 4,881,815 | 11/1989 | Sommargren | |
| 4,881,816 | 11/1989 | Zanoni | |
| 4,883,357 | 11/1989 | Zanoni et al. | |

FOREIGN PATENT DOCUMENTS 149910  3/1962  U.S.S.R. ............................ 356/360

OTHER PUBLICATIONS

"Interpretation of Interferograms", in *The Photonics Design & Applications Handbook*, Bk. 3, 36th Ed., 1990, publ. by Laurin Publishing Company, Inc., of Pittsfield, Mass., pp. 35–40.
"Using Spherical Mirrors for the Infrared", in *The Photonics Design & Applications Handbook*, pp. 204, 205.
*Optical System Design*, by Rudolph Kinglake, Univ. of Rochester, Rochester, N.Y.; publ. by Academic Press, Inc., pp. 245, 246.

*Primary Examiner*—Samuel A. Turner
*Attorney, Agent, or Firm*—Eugene Stephens & Associates

[57] ABSTRACT

A catadioptric imaging system is used to form a converging test beam for measuring large aperture optical elements having convex spherical surfaces. A beamsplitter block divides a collimated beam of coherent monochromatic light from a laser source into a test beam and a reference beam. A focusing system receives the test beam and transforms the beam into a spherically diverging beam emanating from a point source. A beamsplitter plate partially reflects the diverging beam into a further diverging beam that impinges against a concave spherical mirror at a small angle from normal incidence. The mirror reflects the further diverging beam in the form of a converging beam having a numerical aperture at least nearly equal to numerical apertures of the test surfaces. The converging beam is also interrupted by the beamsplitter plate; but on this occasion, the beamsplitter plate partially transmits the converging beam toward a focal point coinciding with a center of curvature of the test surface. Rays of the converging beam that impinge at normal incidence to the test surface are retroreflected back to the point source. The returning test beam is recombined with the reference beam to form an interferogram exhibiting fringe distortions indicative of a departure of the test surface from desired sphericity.

32 Claims, 2 Drawing Sheets

LARGE APERTURE REFLECTIVE INTERFEROMETER FOR MEASURING CONVEX SPHERICAL SURFACES

BACKGROUND

Interferometers are commonly used to measure surface topographies of optical elements. A propagating light wave of constant phase is divided into two wavefronts that are directed along separate optical paths, namely, a test path and a reference path. The test path includes the optical surface being tested, and the reference path includes a known reference surface. After reflecting from test and reference surfaces, the two wavefronts are recombined forming an interferogram. Fringe patterns of the interferogram are interpreted to obtain measures of the surface topography of the test surface.

A majority of precision optical surfaces are spherical segments. The known interferometric techniques are especially well suited to measure concave spherical surfaces. For example, a point light source may be located in the test path at the center of curvature of the concave test surface. To the extent that the test surface is truly spherical, the light impinges at normal incidence to the test surface and is retroreflected along its original path back to the light source. Any deviation of the reflected light from its original path produces fringe distortions in an interference pattern with a reference wavefront indicative of a departure from sphericity.

However, it is much more difficult to use interferometric techniques to measure large convex spherical surfaces. Additional optical elements are used to relay an image of the point source to the center of curvature of convex surfaces. The point source image is relayed by lenses that must be made large enough to produce a converging light beam having marginal rays at normal incidence to the periphery of the convex surface. These lenses are expensive and difficult to make to required accuracy. In fact, it becomes impractical to manufacture optical elements with sufficient accuracy for measuring certain large aperture convex surfaces with the known interferometric techniques.

SUMMARY OF THE INVENTION

Our invention includes a catadioptric imaging system of an interferometer for relaying a point source image to the centers of curvature of convex spherical test surfaces. In place of large lenses for focusing the image of the point source, our system includes three main optical elements that can be manufactured much more easily and at reasonable cost. Accordingly, our system extends practical use of interferometric techniques to accurately measure surface topographies of large aperture convex spherical surfaces.

The first of the three main optical elements of our imaging system is a small group of focusing lenses that receive a collimated beam of coherent monochromatic light from a laser source and transform the beam into a spherically diverging wavefront emanating from a point source (i.e., principal point of focus of the lens group). The second main element is a beamsplitter plate that is located along the path of the diverging wavefront for partially reflecting and partially transmitting incident radiant energy. The third main element is a concave spherical mirror having an optical axis in common with the beamsplitter plate for refocusing the diverging wavefront to an image of the point source at the center of curvature of a convex spherical test surface.

A portion of the radiant energy of the diverging wavefront is reflected by the beamsplitter plate toward the concave mirror which again reflects the light in the form of a converging wavefront having a numerical aperture nearly equal to or greater than the numerical aperture of the convex spherical test surface. The converging wavefront is also interrupted by the beamsplitter plate, but a portion of the remaining radiant energy of the converging wavefront is transmitted through the beamsplitter plate toward a second focal point coinciding with the center of curvature of a convex surface under test.

Rays of the converging wavefront impinging at normal incidence to the test surface are retroreflected along their original path back to the point source. Along the return path, the beamsplitter plate partly transmits the retroreflected light from the test surface to the concave mirror and partly reflects the retroreflected light from the concave mirror back to the point source. The returning wavefront is compared with a reference wavefront according to known interferometric practices.

The beamsplitter plate of our catadioptric imaging system provides several important functions. As a reflector, the beamsplitter plate projects the diverging wavefront from the point source (i.e., principal focus of lens group) as a further diverging wavefront over a substantial portion of the concave spherical mirror and refocuses the returning light reflected by the concave mirror back to the point source. As a transmitter, the beamsplitter plate allows the converging wavefront reflected by the concave mirror to reach the test surface and allows the retroreflected light from the test surface to return to the concave mirror.

Although the beamsplitter plate is made to exhibit both partial specular reflection and partial regular transmittance to avoid undesirable diffusion of the test wavefront, the beamsplitter plate also exhibits some unavoidable refractivity that introduces a spherical aberration into the wavefront. The amount of spherical aberration is proportional to the thickness of the beamsplitter plate. Nevertheless, it is preferred to make the plate with sufficient thickness to resist vibration from acoustical disturbances and other air currents.

Our catadioptric imaging system compensates for the spherical aberration arising from refraction through the beamsplitter plate by creating a cancelling spherical aberration of an opposite sign. The cancelling spherical aberration is created by exploiting a property of concave spherical mirrors, which produce such oppositely signed aberrations when focused at a departure from unit magnification. A concave mirror is focused at unit magnification when object and image points of the mirror coincide with the mirror's center of curvature. However, in moved along the optical axis away from a position that reflects the diverging wavefront at normal incidence to the mirror. Thus, the point source image is effectively spaced from the mirror at an object distance that differs from an image distance at which the converging wavefront reflected from the mirror is focused. The magnitude of the resulting aberration becomes larger with increasing departure from unit magnification. Accordingly, the beamsplitter plate is adjusted along the optical axis to a position that produces a cancelling spherical aberration having a magnitude that minimizes overall spherical aberration from both the concave spherical mirror and the beamsplitter plate at a new focus.

The convex test surface is also adjusted along the optical axis of the mirror to a position that locates its center of curvature at the new focus. Rays converging on the new focus are retroreflected at points of normal incidence to the test surface. The retroreflected light returns along its original path back to the point source. However, any deviation of the test surface from a desired spherical surface reflects the converging rays of the test wavefront along paths that do not return to the point source. Accordingly, any deviations of the test surface from a spherical form mismatches the test and reference wavefronts and produces fringe distortions in an interferogram indicative of the departure from sphericity.

A significant portion of the radiant energy of the test wavefront is also lost by the repeated interruption of the test path with the beamsplitter plate. Accordingly, a beamsplitter block that normally separates a laser beam into the test and reference beams provides for delivering substantially more radiant energy to the test beam to compensate for the losses of the beamsplitter plate.

DRAWINGS

DETAILED DESCRIPTION

Figure 1:
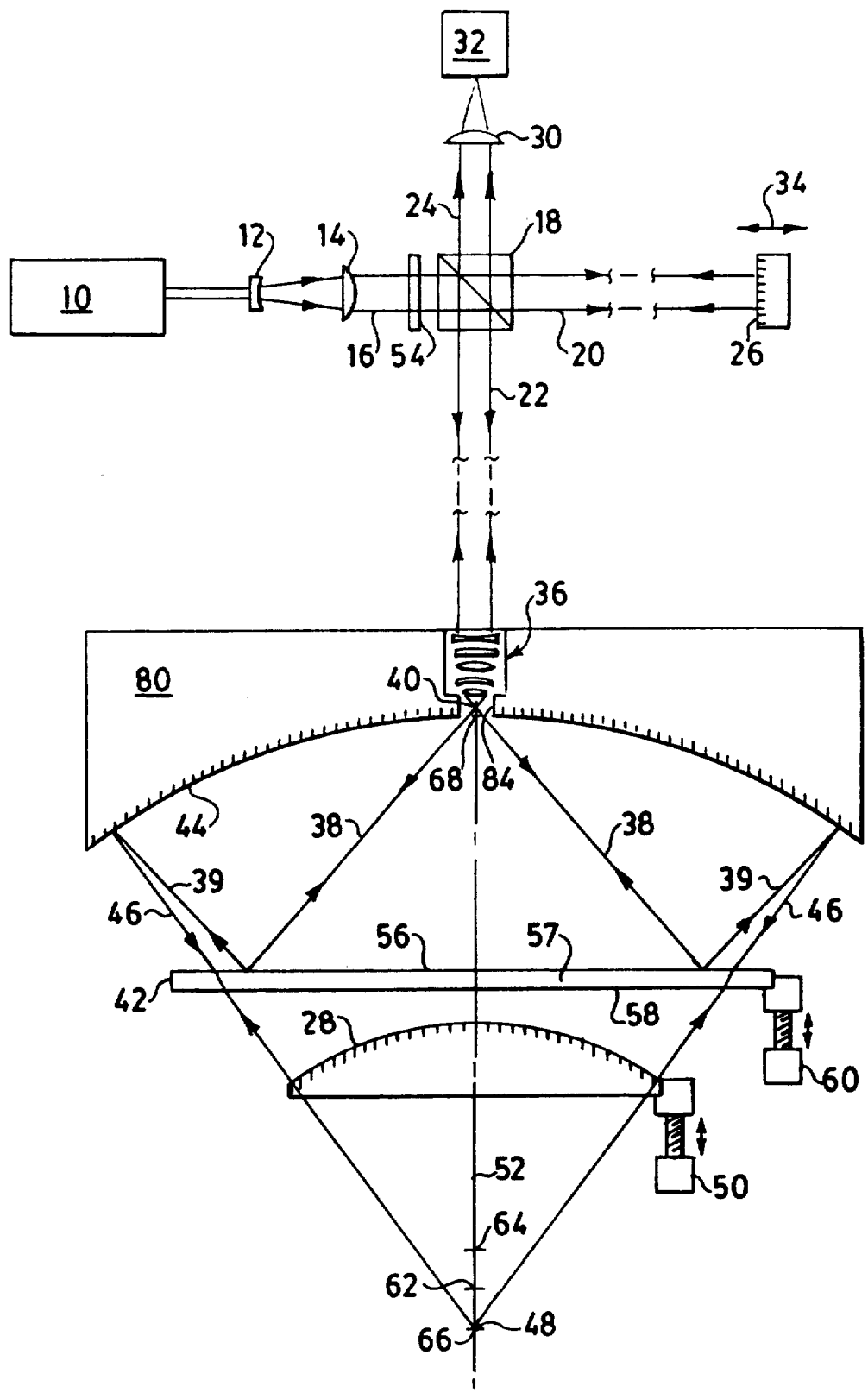
FIG. 1 is a schematic depiction of an interferometer having a novel catadioptric imaging system for measuring a convex optical surface.

Our invention, as depicted in FIG. 1, is embodied in a Twyman-Green interferometer having a novel catadioptric imaging system. The interferometer includes a conventional laser source 10 for producing, together with a diverging lens 12 and collimating lens 14, a collimated beam 16 of coherent monochromatic light. A beamsplitter block 18 divides the beam 16 into two collimated wavefronts, namely, a reference wavefront 20 that is transmitted through the beamsplitter block and a test wavefront 22 that is reflected by the beamsplitter block. Of course, it would also be possible to separate the two wavefronts by transmitting the test wavefront 22 and reflecting the reference wavefront 20 in accordance with known interferometric practices.

Both of the wavefronts 20 and 22 are retroreflected back to the beamsplitter block 18, where they are recombined to form an interference wavefront 24. The reference wavefront 20 is retroreflected by flat reference mirror 26, and the test wavefront 22 is retroreflected by spherical portions of a convex test surface 28. The interference wavefront 24 is projected by field lens 30 upon the aperture of a camera 32 or other imaging device for recording an interference pattern between the reference and test wavefronts. Any departure of the test surface 28 from a spherical form produces a fringe distortion in the recorded interferogram. The reference mirror 26 is movable in the direction of arrows 34 to physically modulate the interference fringes to obtain phase information about the fringe distortion in a known manner.

The optical path taken by the test wavefront 22 is controlled by the novel catadioptric imaging system of our invention for producing a cone of converging light that impinges at normal incidence to the desired spherical surface of the convex test surface 28. The test wavefront 22 enters the catadioptric imaging system through a group of focusing lenses 36 that transform the collimated beam of the test wavefront into a spherically diverging wavefront 38 emanating from a point source 40 defined by the principal point of focus of the lens group. The diverging wavefront 38 is interrupted by a beamsplitter plate 42 that is treated for partially reflecting and partially transmitting incident radiant energy. The portion of the diverging wavefront 38 that is reflected by the beamsplitter plate 42 is projected as a further diverging wavefront 39 over the reflective surface of a concave spherical mirror 44.

Radiant energy of the further diverging wavefront 39 reaching the concave mirror 44 is refocused in the form of a converging wavefront 46 having a numerical aperture nearly equal to or greater than the numerical aperture of the convex test surface 28. The beamsplitter plate 42 also interrupts the converging wavefront 46 but allows a portion of the converging wavefront's radiant energy to be transmitted through the beamsplitter plate toward a second focal point coinciding with the center of curvature 48 of the convex test surface 28. A conventional positioning system indicated at 50 is used to adjust the position of the convex test surface 28 along a common optical axis 52 of the convex test surface 28, beamsplitter plate 42, and concave mirror 44 to locate the center of curvature 48 coincident with the focal point of the converging wavefront 46.

Rays of the converging wavefront 46 striking the convex test surface 28 at normal incidence are retroreflected along their original path back to the point source 40. However, the path of the retroreflected light (shown by arrows opposing the original directions of the diverging wavefronts 38 and 39 and the converging wavefront 46) is interrupted twice by the beamsplitter plate 42. Only part of the radiant energy of the retroreflected light from the test surface 28 is transmitted through the beamsplitter plate to the concave mirror 44, and only part of the remaining radiant energy of the retroreflected light that is reflected by the concave mirror is also reflected by the beamsplitter plate back to the point source 40.

Nonetheless, the test wavefront 22 can be provided initially with an increased amount of radiant energy so that sufficient radiant energy is returned by the test wavefront 22 to the beamsplitter block 18 to form an interference pattern with the reference wavefront 20. For example, a polarizing filter 54 may be used in conjunction with the beamsplitter block 18 to direct significantly more radiant energy of the collimated beam 16 to the test wavefront 22 than to the reference wavefront 20 to compensate for the losses of radiant energy along the test path.

Preferably, upper surface 56 of the beamsplitter plate 42 is treated with a partial reflective coating to limit the number of times that the test wavefront must traverse underlying optical material 57 of the beamsplitter plate. Since the test wavefront is reflected from the upper surface 56 of the plate, the test wavefront encounters the optical material 57 of the plate on only the two occasions in which the test wavefront is transmitted through the plate. Bottom surface 58 of the plate may also be treated with an anti-reflective coating to minimize diffusion of the retroreflected light that is transmitted through the plate.

However, each time the test wavefront is transmitted through the optical material 57 of the beamsplitter plate, the test wavefront is slightly refracted. The amount of refraction is proportional to the thickness of the optical material 57. Refraction of the converging wavefront 46 produces a spherical aberration characterized by meridian rays that focus farther from the plate than paraxial rays of the converging wavefront. Although it is possible to reduce the magnitude of the spherical aberration by decreasing the thickness of the optical material 57 of the plate, the optical material is preferably made of sufficient thickness to resist undesirable vibrations from acoustical disturbances and other movements of air and supporting structures within the interferometer.

The beamsplitter plate 42 is adjustable by a conventional positioning system 60 along the optical axis 52 to a position that reflects the further diverging wavefront 39 at a slight angle from normal incidence to the concave spherical mirror 44. In other words, the rays of the converging wavefront 46 are reflected from the concave mirror along lines that intersect the optical axis 52 in positions that depart from the concave mirror's center of curvature 62. Thus, the concave mirror 44 m two conjugate points of the point source 40 at different positions along the optical axis 52. An object point 64 at which the point source is effectively spaced from the concave mirror is located on the optical axis 52 in a different position than an image point 66 at which the point source is refocused.

Any departure of the two conjugates 64 and 66 from the mirror's center of curvature 62 focuses the mirror at a departure from unit magnification and introduces a spherical aberration opposite in sign to the spherical aberration caused by refraction of the beamsplitter plate 42. In other words, meridian rays reflected by the concave mirror are focused nearer to the plate than reflected paraxial rays. The amount of spherical aberration caused by the departure from unit magnification of the concave mirror may be controlled by adjusting the position of the beamsplitter plate along the optical axis; and in accordance with our invention, the beamsplitter plate is located along the optical axis in a position that substantially cancels the spherical aberration caused by refraction of the beamsplitter plate.

The convex test surface 28 is also adjusted along the optical axis 52 to a position that locates its center of curvature 48 coincident with the image point 66 of the concave mirror. Thus, an image of the point source is reproduced at the test surface's center of curvature 48 with minimal spherical aberration so that rays of the converging wavefront 46 impinge at normal incidence to the desired spherical surface of the test surface.

The image distance of the image point 66 from the mirror's vertex 68 in FIG. 1 is greater than the object distance at which the object point 64 is spaced from the vertex 68. This relationship is achieved by moving the beamsplitter plate 42 closer to the mirror's vertex 68 than to the mirror's center of curvature 62. However, in FIG. 2, the beamsplitter plate 42 is moved closer to the mirror's center of curvature 62 than to the mirror's vertex 68. A new image point 70 is defined thereby closer to the vertex 68 than a new object point 72. The center of curvature 74 of test surface 76 is located coincident with the new image point 70 at which the departure from unit magnification compensates for the spherical aberration caused by refraction through the beamsplitter plate.

Figure 2:
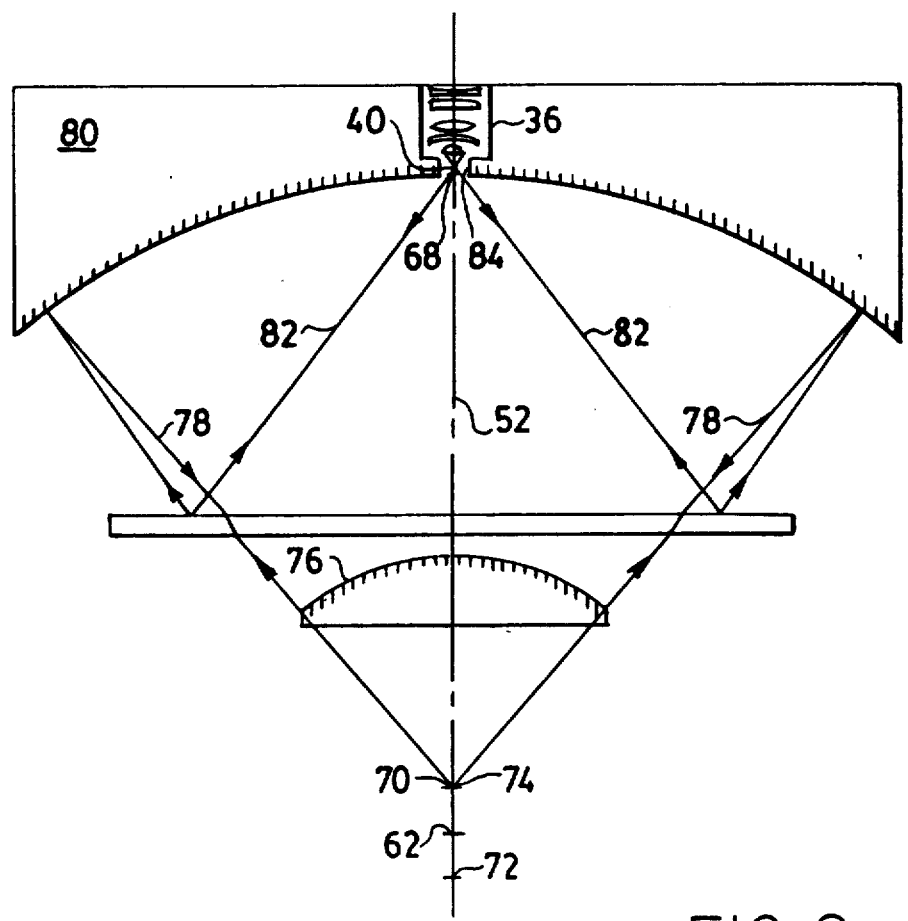
FIG. 2 is a schematic depiction of the catadioptric imaging system set up for measuring test surfaces having larger numerical apertures.

However, by comparison of the arrangements depicted in FIGS. 1 and 2, it can be seen that the arrangement of FIG. 1 provides more clearance between the test surface's center of curvature 48 and the beamsplitter plate, whereas the arrangement of FIG. 2 provides a converging wavefront 78 having a larger numerical aperture than the numerical aperture of the converging wavefront 46. Ordinarily, the arrangement of FIG. 1 is preferred. However, the arrangement of FIG. 2 is preferred for measuring test surfaces having numerical apertures greater than a numerical aperture of the concave mirror measured at its center of curvature 62.

Both FIGS. 1 and 2 also show the lens group 36 mounted within a hole formed in substrate 80 of the concave mirror in a position that slightly recesses the point source 40 within the substrate. Although the point source 40 is located near the vertex 68, the small amount of recess permits the beamsplitter plate 42 to be located closer to the vertex to provide additional clearance for measuring larger radius test surfaces. The test wavefront projects from the point source as spherically diverging wavefronts 38 or 82 through a small aperture 84 formed in the reflective surface of the concave mirror. The diameter of the aperture 84 is limited to form a stop for isolating the point source from diffuse reflections from the test surfaces 28 or 76 and the beamsplitter plate 42.

However, the small aperture 84 formed in the concave mirror 44 obstructs reflection of a small portion of the test wavefront so that a central area of the test surface cannot be measured. Although such a small obstruction is generally acceptable, it would be possible to eliminate the obstruction by forming the mirror substrate out of a transmitting material and by applying a partially reflective coating to the concave surface of the mirror. The spherically diverging wavefront 38 or 82 could then be projected through the substrate and partially reflective coating without requiring an aperture in the mirror.

Figure 3:
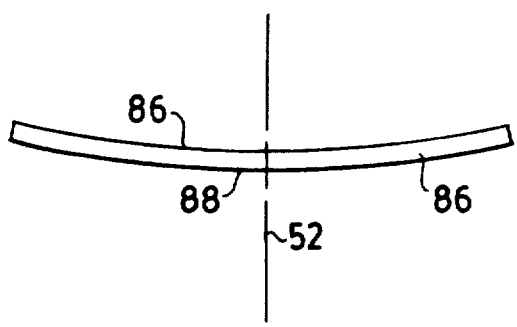
FIG. 3 is a schematic depiction of a beamsplitter plate bent to form a weak lens.
Figure 4:
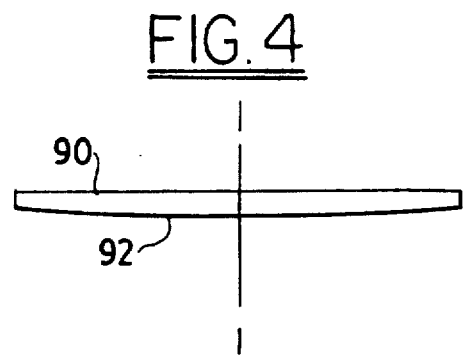
FIG. 4 is a schematic depiction of another beamsplitter plate including a convex surface for reducing peripheral thickness of the plate.

Although the beamsplitter plate is preferably made with plane-parallel surfaces, it would also be possible to reduce mismatch between certain higher order components of spherical aberrations of the point source image by slightly bending the plate about a surface normal coincident with the optical axis 52 to form a very weak lens. For example, FIG. 3 shows (with exaggeration) a beamsplitter plate 86 with both a concave surface 86 and a convex surface 88 bent in the same direction, preferably toward the concave mirror. Other higher order components of spherical mismatch are more pronounced for measures of convex test surfaces having very large numerical apertures. These other higher order components can be reduced as shown in FIG. 4 by forming the bottom surface 92 of a beamsplitter plate 90 as a convex surface. The curvature imposed upon the bottom surface 92 reduces the thickness of the plate 90 toward its periphery so that marginal and paraxial rays travel more even distances through the plate.

It is also preferred that the common optical axis of the concave mirror, the beamsplitter plate, and the test surface extends in a vertical direction so that all three of the just-named optical elements may be uniformly supported about their respective outer annuli. Any resulting flexure of the elements, particularly the beamsplitter plate, can be easily compensated for by adjusting the position of the beamsplitter plate along the optical axis.

We claim:

1. A catadioptric imaging system of an interferometer for measuring convex spherical test surfaces comprising:
   a focusing system for receiving a beam of light and for transforming the beam into a spherically diverging wavefront emanating from a point source;
   a beamsplitter plate located along the path of the spherically diverging wavefront for partially reflecting and partially transmitting incident radiant energy;
   a concave spherical mirror having an optical axis in common with said beamsplitter plate for refocusing the diverging wavefront an image of the point source along said optical axis at a departure from unit magnification; and
   an adjustable support for mounting the convex spherical test surfaces in positions along said optical axis at which respective centers of curvature of the convex test surfaces coincide with the point source image.

2. The imaging system of claim 1 in which said beamsplitter plate is treated to exhibit partial specular reflection and partial regular transmittance.

3. The imaging system of claim 2 in which said beamsplitter plate provides for reflecting a portion of the radiant energy of the diverging wavefront over a substantial portion of said concave mirror and for transmitting a portion of the remaining radiant energy reflected by said concave mirror toward the point source image.

4. The imaging system of claim 3 in which said concave mirror refocuses the diverging wavefront partially reflected by said beamsplitter plate in the form of a converging wavefront having a numerical aperture at least nearly equal to respective numerical apertures of the convex test surfaces.

5. The imaging system of claim 4 in which refraction of the converging wavefront through said beamsplitter plate produces a first spherical aberration and said beamsplitter plate is adjusted along said optical axis away from a position that would reflect the diverging wavefront at normal incidence to said concave spherical mirror to a position that produces a second spherical aberration of opposite sign for minimizing spherical aberration of the point source image.

6. The imaging system of claim 5 in which said beamsplitter plate is adjusted along said optical axis away from the position that would reflect the diverging wavefront at normal incidence by an amount that increases with increasing thickness of said beamsplitter plate.

7. The imaging system of claim 6 in which said beamsplitter plate also provides for partly transmitting retroreflected light from the convex test surfaces back to the concave mirror and for partly reflecting the retroreflected light from the concave mirror back to the point source.

8. A catadioptric imaging system of an interferometer for measuring convex spherical test surfaces comprising:
   a focusing system for receiving a beam of light and for transforming the beam into a spherically diverging wavefront emanating from a point source;
   a beamsplitter plate located along the path of the spherically diverging wavefront for partially reflecting and partially transmitting incident radiant energy;
   a concave spherical mirror having an optical axis in common with said beamsplitter plate for refocusing the diverging wavefront to an image of the point source along said optical axis at a departure from unit magnification;
   said beamsplitter plate located along said optical axis in a position at which said concave mirror forms two conjugate points of the point source along said optical axis at different distances from a vertex of said concave mirror; and
   one of said conjugate points being an object point located along said optical axis at a distance from the point source substantially equal to two times a distance between said beamsplitter plate and said point source, and the other of said conjugate points being an image point located along said optical axis in a position coinciding with respective centers of curvature of the convex test surfaces.

9. The imaging system of claim 8 in which said image point is located at an image distance from said vertex exceeding an object distance at which said object point is spaced from said vertex for measuring convex test surfaces having respective numerical apertures no greater than a numerical aperture of said concave mirror measured at its center of curvature.

10. The imaging system of claim 8 in which the image point is located at an image distance that is shorter than the object distance for measuring convex test surfaces having respective numerical apertures greater than the numerical aperture of the concave mirror measured at its center of curvature.

11. A large aperture reflective interferometer for measuring convex spherical surfaces of optical test pieces comprising:
    a laser light source producing a beam of coherent monochromatic light;
    a beamsplitter block for dividing the laser beam into a test beam and a reference beam;
    a focusing system for receiving the test beam and for diverging the test beam from a point source;
    a beamsplitter plate for partially reflecting the diverging test beam into a further diverging test beam;
    a concave spherical mirror for reflecting said further diverging test beam as a converging test beam having a numerical aperture at least nearly equal to an aperture of a convex spherical surface of a test piece; and
    adjustable support for mounting the test piece in a position along a common optical axis of said beamsplitter plate and said concave spherical mirror at which a center of curvature of the convex spherical test surface coincides with a focus of the converging test beam.

12. The interferometer of claim 11 in which said focusing system includes a principal point of focus corresponding to the point source located in the vicinity of a vertex of said concave spherical mirror.

13. The interferometer of claim 12 in which said focusing system includes a group of lenses for receiving the test beam in the form of a collimated beam of coherent monochromatic light and for transforming the test beam into the spherically diverging beam having a principal point of focus defining the point source.

14. The interferometer of claim 13 in which said concave spherical mirror includes, in addition to a concave reflective surface, a substrate for mounting said group of lenses in a position that locates the principal point of focus of said group of lenses near a vertex of said concave mirror.

15. The interferometer of claim 14 in which said concave mirror includes an aperture formed in said reflective surface of the concave mirror through which the diverging test beam from said focusing system is projected.

16. The interferometer of claim 15 in which the principal point of focus of said lens group is located a short distance from said vertex within said substrate.

17. The interferometer of claim 11 in which said beamsplitter plate includes two surfaces, one of said surfaces faces said concave mirror and the other of said surfaces faces said adjustable support.

18. The interferometer of claim 18 in which both of said surfaces of the beamsplitter plate include commonly oriented surface normals extending coincident with said optical axis.

19. The interferometer of claim 18 in which said surfaces of the beamsplitter plate are substantially plane-parallel surfaces.

20. The interferometer of claim 18 in which at least one of said surfaces of the beamsplitter plate is slightly curved in a direction toward said concave mirror to reduce high order spherical aberrations of the focus of the converging beam.

21. The interferometer of claim 18 in which said one surface of the beamsplitter plate facing the concave mirror is treated with a partial reflective coating.

22. The interferometer of claim 21 in which said other surface of the beamsplitter plate facing the adjustable support is treated with an anti-reflective coating.

23. The interferometer of claim 18 in which said optical axis extends in a vertical direction.

24. The interferometer of claim 18 in which the test beam encounters said beamsplitter plate on four occasions, and on two of said occasions said beamsplitter plate reflects the test beam and on the other two of said occasions said beamsplitter plate transmits the test beam.

25. The interferometer of claim 24 in which said beamsplitter block provides for diverting significantly more radiant energy to the test beam than to the reference beam.

26. A method of measuring a convex spherical test surface with an interferometer comprising the steps of:

dividing a collimated beam of coherent monochromatic light from a laser source into a test beam and a reference beam;

transforming the test beam into a spherically diverging beam emanating from a point source;

partially reflecting the diverging test beam with a beamsplitter plate into a further diverging beam that impinges against a concave spherical mirror at a small angle to normal incidence;

reflecting the further diverging beam from the concave mirror into a converging beam having a numerical aperture at least nearly equal to respective numerical apertures of the convex spherical test surfaces;

partially transmitting the converging beam through the beamsplitter plate toward an image of the point source at a departure from unit magnification;

retroreflecting the converging wavefront at normal incidence to the convex test surface back to the point source; and recombining the test beam and the reference beam to form an interferogram.

27. The method of claim 26 including a further step of adjusting a mounting location of the convex test surface to a position at which a center of curvature of the convex test surface coincides with the point source image.

28. The method of claim 27 in which said step of partially transmitting the converging beam produces a first spherical aberration.

29. The method of claim 28 including the further step of adjusting a mounting location of the beamsplitter plate with respect to the concave mirror to a position that produces a second spherical aberration of opposite sign for minimizing spherical aberration of the point source image.

30. The method of claim 29 in which said step of retroreflecting the converging test beam includes partially transmitting the retroreflected light back through the beamsplitter plate to the concave mirror, reflecting the retroreflected light from the concave mirror back to the beamsplitter plate, and partially reflecting the retroreflected light from the beamsplitter plate back to the point source.

31. The method of claim 30 including the further step of aligning respective surface normals of the concave mirror, beamsplitter plate, and convex test surface with a common optical axis.

32. The method of claim 31 including the further step of orienting the common optical axis to a vertical direction.

* * * * *